3,290,252
COBALT CONCENTRATION FROM COBALT
SOL BY EXTRACTION
Orvis V. Larsen, Richmond, and Joe B. Lavigne, Berkeley, Calif., assignors to Chevron Research Company, a corporation of Delaware
No Drawing. Filed July 16, 1963, Ser. No. 295,502
7 Claims. (Cl. 252—62.5)

This invention concerns the extraction of polymer from compositions of discrete ferromagnetic particles encapsulated in a polymeric organic envelope and dispersed in an inert organic medium. More particularly, this invention concerns extraction with ketonic and halo-organic solvents of novel compositions of ferromagnetic metals existing as particles encapsulated in organic polymeric envelopes.

Novel compositions have been prepared in which ferromagnetic particles exist as discrete entities of a size in the range of about 10 to 1,000 A. dispersed in an organic medium. The particles are encapsulated in an organic polymeric envelope and, therefore, remain discrete for indefinite periods of time. The small size of the particles limits them to single domains which is desirable in many applications, e.g., magnetic recording members. Description of the preparation of the particles and their compositions is found in copending application Nos. 249,323, filed on January 4, 1963, now abandoned, and 249,525–6, issued as U.S. Patent Nos. 3,228,881 and 3,228,882, respectively, whose disclosures are incorporated herein as if completely set out.

The compositions as prepared have particles of metal of atomic number 26–28, i.e., iron, cobalt and nickel, and usually exist as stable colloidal suspensions. The particles are generally in the range of about 10 to 1,000 A. in size and more customarily in the range of about 100 to 750 A. in size.

The particles are encapsulated in a polymeric envelope. Numerous polymers are used in their preparation, both addition and condensation polymers being applicable. Of particular interest are addition polymers having at least 50% of an ester-containing monomer, e.g., acrylates and vinyl esters. Generally, the polymer will have at least 75% of an ester monomer. The other monomers may be greatly varied including hydroxy-containing monomers, amide-containing monomers, etc., e.g., N-vinyl-pyrrolidone, methacrylamide, 2-hydroxyethyl acrylate, vinyl alcohol, etc.

The compositions as prepared usually have a weight ratio of metal to polymer in the range of about 50:50 to 92:8, more generally in the range of 70:30 to 90:10. This range of metal to polymer weight ratio is required in order to obtain the small discrete ferromagnetic particles. If too little polymer is used during the preparation, the metal aggregates and forms large particles; also, no dispersion is formed.

For many applications, it is preferable to have a very small amount of polymer in relation to metal. This is particularly true when the metal composition is to be mixed subsequently with material which can be used as a binder when preparing magnetic recording members. Generally high concentrations of metal are desired in the magnetic recording member and this is only possible when the ratio of metal to polymer is high, prior to dilution with a binder.

The solvents used in the preparation of the ferromagnetic particles are usually hydrocarbons, particularly aromatic hydrocarbons, e.g., toluene, xylene, cumene, etc. These solvents are not very effective in removing polymer from the metal in order to increase the metal to polymer ratio. A satisfactory extracting solvent must be able to dissolve the polymer, but must not significantly displace the bound polymer (polymer acting as an envelope) and cause metal aggregation. Since the metal particles are ferromagnetic, they attract each other. In the absence of sufficient polymer to maintain an effective envelope as a barrier to metal-metal bonding, the metal particles would bond together to form undesirably large particles which would be multi-domain. The solvent used to extract must be able to selectively remove polymer permitting retention of sufficient polymer to act as a barrier, while removing superfluous polymer. The solvent must also be inert to the metal, since the metal in its finely divided state is chemically reactive.

It has now been found that the polymer can be extracted giving high weight ratios of metal to polymer of at least 85:15, and up to 97:3, preferably 90:10 to 95:5, by extracting the metal dispersions in the presence of the original solvent with a ketonic or aliphatic halohydrocarbon having a plurality of halogens and separating the solvent from the concentrated dispersion. This process can be repeated until the desired ratio of metal to polymer is obtained.

The solvents used for the extraction are aliphatic ketones or aliphatic halohydrocarbons. The ketones are of from 3 to 8 carbons and include acetone, methyl ethyl ketone, methyl isobutyl ketone, dipropyl ketone, etc. The aliphatic halohydrocarbons are of from 1 to 4 carbons having a plurality of halogens, preferably chlorine. The number of halogens will usually be in the range of about 2 to 6. Illustrative compounds in this range are chloroform, ethylene dichloride, bromoform, ethylene dibromide, trichlorofluoromethane, bromochlorotrifluoroethane, ethylidene chloride, trimethylene dichloride, propylene dichloride, isopropylidene chloride, tetramethylene dichloride, chlorothene, vinyl trichoride, trichloroethylene, etc.

The composition as prepared is usually a colloidal suspension of minute particles having a ratio of metal to polymer usually of at least about 50:50, more generally in the range 70:30 to 90:10. In order to be able to conveniently carry out the extractions, the solids content of the suspension may be increased by removal of excess solvent after centrifugation or coagulation, for example, by treatment in a magnetic field. The magnetic treatment involves holding the dispersion in a magnetic field of about 1,000 to 10,000 gauss for a period of time in the range of about 0.1 to 100 seconds. The magnetically treated sample is then centrifuged, if necessary, allowed to stand, and the supernatant liquid decanted.

The extracting solvent is then added and the mixture vigorously stirred, centrifuged and the supernatant liquid decanted. This may be repeated a number of times. By virtue of the extraction, samples are obtained which have metal to polymer ratios of at least 90:10 and generally higher. The particles as obtained do not have metal to metal aggregation and are readily dispersed and spread. The concentrated composition can be mixed with other polymers which find use as binders or can be used directly in a wide variety of applications.

The sample as prepared will usually have from about 1 to 10% by weight of solids; metal and polymer. The concentration step will usually increase the percent solids to a range of about 10 to 50, preferably 25% by weight. A sufficient amount of the extracting solvent is then added to bring the weight percent of solids back to the range of about 1 to 20%, preferably 3 to 8%. The mixture is vigorously stirred, centrifuged, if necessary, and the supernatant liquid decanted. Successive magnetic treatments are generally not required.

The amount of the extracting solvent will usually be at least 10 times by weight the amount of polymer present. More generally, it will be at least 50 times by weight and will customarily be in the range of about 50 to 500 times. Occasionally, it will be preferable to mix the extracting solvent with a hydrocarbon in order to have the desired percent solids, as well as the desired ratio of polymer to extracting solvent.

The time for the extraction is not critical. Depending on the effectiveness of the stirring, relatively short times can be used. Usually, the mixture will be stirred for at least 5 minutes and generally the time will not exceed 1 hour. Ambient temperatures and autogenous pressures are satisfactory and no advantage is found in increasing or decreasing the temperatures and pressures.

The following examples are offered by way of illustration and not by way of limitation.

Example I

A composition containing metal particles was used as prepared in Example A. The sample had been concentrated magnetically. A mixture of 40 grams of the slurry containing 7.6 grams of solids—6.7 grams of cobalt metal and 0.9 gram of a terpolymer of ethyl acrylate, methyl methacrylate and vinylpyrrolidone—(metal to polymer ratio of 88.12) and about 125 ml. of methyl ethyl ketone was vigorously stirred. The product was then concentrated. The supernatant liquid decanted. The supernatant liquid contained 0.3 gram of polymer, providing a product having a metal to polymer ratio of 92:8.

N-vinyl-2-pyrollidone:ethyl acrylate:butyl methacrylate— 3:1:20:76). To this mixture was added 290 ml. of a 1:1 mixture of methyl ethyl ketone and toluene to provide a dispersion containing 6% solids. The mixture was vigorously stirred and then centrifuged 15 minutes and the supernatant liquid decanted. The extraction procedure was repeated two more times, yielding a final product containing 17.8 grams of cobalt, 1.7 grams of polymer and 61 grams of solvent, for a 24% solids dispersion, having a metal to polymer ratio of 91:9.

Example XI

The dispersion used was held in a magnetic field for 1 minute at 4,000 oersteds and then centrifuged for 15 minutes at 700 G's and the supernatant liquid decanted. The resulting dispersion had 17.8 grams of cobalt, 3.2 grams of polymer described in Example X, and 86 grams of toluene. The extraction procedure was carried out as described in Example X. The final product had 17.8 grams of cobalt, 2.0 grams of polymer and 64 grams for a 23.6% solids dispersion period of 7½ hours. The material was then cooled to 100° F.

As will be evident to those skilled in the art, various modifications on this process can be made or followed, in the light of the foregoing disclosure and discussion, without departing from the spirit or scope of the disclosure or from the scope of the following claims.

We claim:
1. A method for increasing the metal to polymer weight ratio of a dispersion of ferromagnetic particles of metals of atomic number 26 to 28, wherein the metal is present as particles of a size in the range from about 10 to 1,000 A. and encapsulated in a polymeric envelope, said particles being dispersed in an inert hydrocarbon medium, wherein the combined weight of metal and polymer is in the range from about 1 to 10% of the total composition, which comprises concentrating said dispersion to a composition wherein the total weight percent of metal and polymer is in the range of about 10 to 50%, by contacting said dispersion with at least 10 times by weight of polymer of a solvent selected from the group consisting of ketones of from 3 to 8 carbons and aliphatic halohydrocarbons of from 1 to 4 carbons having a plurality of halogens, sedimenting the resulting composition and removing the supernatant liquid and recovering the concentrated ferromagnetic dispersion.

2. A method according to claim 1, wherein the contacting solvent is in the range from about 50 to 600 times the weight of polymer.

3. A method according to claim 1, wherein the contacting solvent is a ketone of 3 to 8 carbons.

4. A method according to claim 3, wherein the contacting solvent is methyl etheyl ketone.

5. A method according to claim 1, wherein the contacting solvent is chloroform.

6. A method of increasing the ratio of metal to polymer in a composition of ferromagnetic metals of atomic number 26 to 28, existing as a dispersion of particles of a size in the range of about 10 to 1,000 A. and encapsulated in an acrylate polymer dispersed in an inert hydrocarbon medium wherein the ratio of metal to polymer is in the range of about 50:50 to 90:10 by weight and the percent by weight of solids as polymer and metal of the total composition is in the range of about 10 to 25%, which comprises contacting said composition with at least 10 times by weight of polymer of a solvent selected from the group consisting of aliphatic ketones of from 3 to 8 carbons and halohydrocarbons of from 2 to 6 carbons having a plurality of halogens in an amount sufficient to provide a composition having from 1 to 10% by weight of solids, separating the resulting mixture into a lower phase and an upper phase, removing said upper phase and recovering the concentrated composition.

7. A method according to claim 6, wherein the extraction is carried out a plurality of times.

References Cited by the Examiner
UNITED STATES PATENTS

| | | | |
|---|---|---|---|
| 2,658,059 | 11/1953 | Peters et al. | 252—414 |
| 2,754,344 | 7/1956 | Weatherly | 252—414 |
| 2,784,238 | 3/1957 | Jacobs | 252—414 |
| 2,891,935 | 6/1959 | Lanning | 252—414 |
| 2,992,180 | 7/1961 | Schatz et al. | 252—414 |
| 3,178,403 | 4/1965 | Ueda et al. | 260—94.7 |
| 3,186,953 | 6/1965 | Eck | 252—414 |
| 3,190,936 | 6/1965 | Child et al. | 252—414 |
| 3,200,007 | 8/1965 | Flowers | 252—62.5 |

TOBIAS E. LEVOW, *Primary Examiner.*

R. D. EDMONDS, *Assistant Examiner.*